Aug. 31, 1965    J. M. DAVIES ETAL    3,203,514
TURBOCHARGER BRAKE

Filed April 10, 1963    2 Sheets-Sheet 1

INVENTORS
James M. Davies
BY William G. Johnson

Fryer and Zimmold
ATTORNEYS

Aug. 31, 1965        J. M. DAVIES ETAL        3,203,514
TURBOCHARGER BRAKE
Filed April 10, 1963                2 Sheets-Sheet 2

INVENTORS
James M. Davies
BY William G. Johnson
ATTORNEYS

# United States Patent Office 3,203,514
Patented Aug. 31, 1965

3,203,514
TURBOCHARGER BRAKE
James M. Davies, Orinda, Calif., and William G. Johnson, Pekin, Ill., assignors to Caterpillar Tractor Co., Peoria, Ill., a corporation of California
Filed Apr. 10, 1963, Ser. No. 272,129
4 Claims. (Cl. 188—170)

This invention relates to braking means to prevent operation of an engine turbocharger after starting of the engine and prior to the time when the lubrication system has supplied adequate lubricant to the turbocharger bearings.

Many turbocharger bearing failures have resulted from lack of lubrication immediately after starting of an engine. Since turbochargers operate at extremely high speeds and are brought up to speed in a few seconds after engine starting, bearing failures occur before lubricating oil reaches them. This is particularly true when oil filters have been replaced, in cold weather or when an engine has been idle for a long time.

It is the object of the present invention to provide a simple inexpensive and dependable means to prevent operation of an engine turbocharger until a positive flow of oil to its bearings is assured.

Further and more specific objects and advantages of the invention and the manner in which it is carried into practice are made apparent in the following specification by reference to the accompanying drawings.

Figure 1:
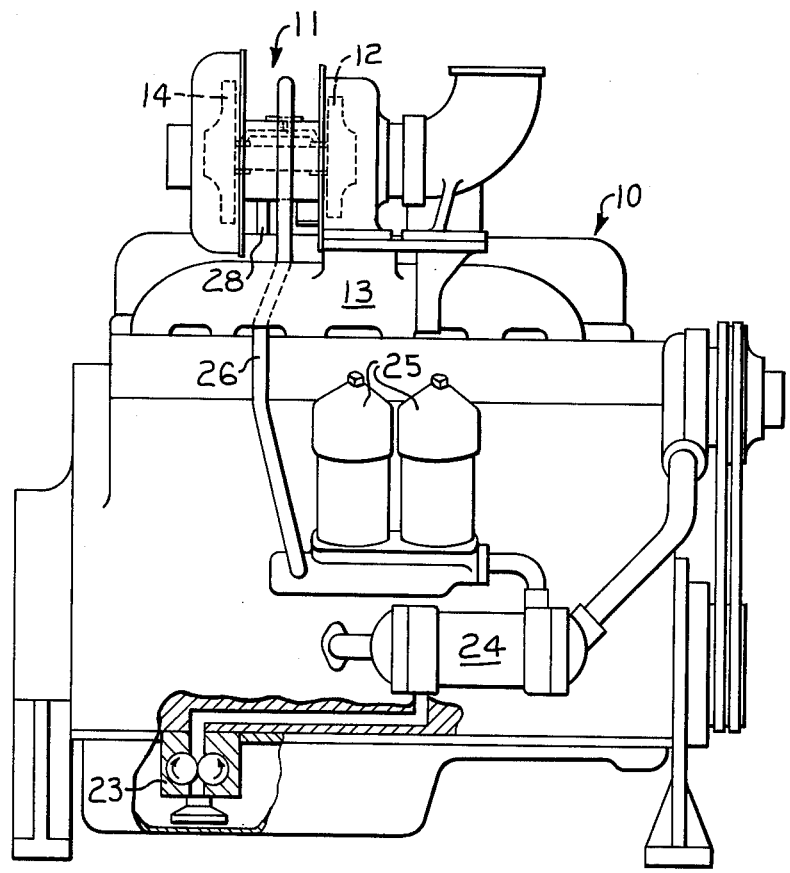
Figure 3:
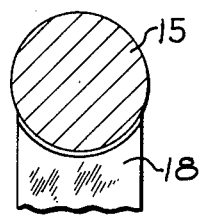
Figure 2:
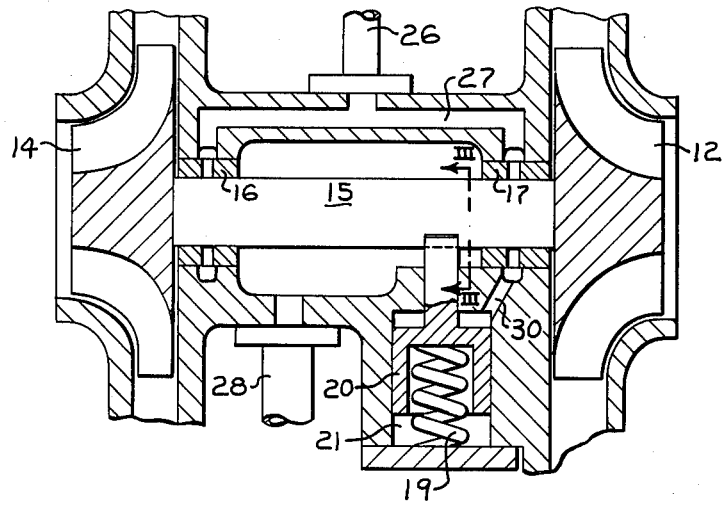
Figure 4:
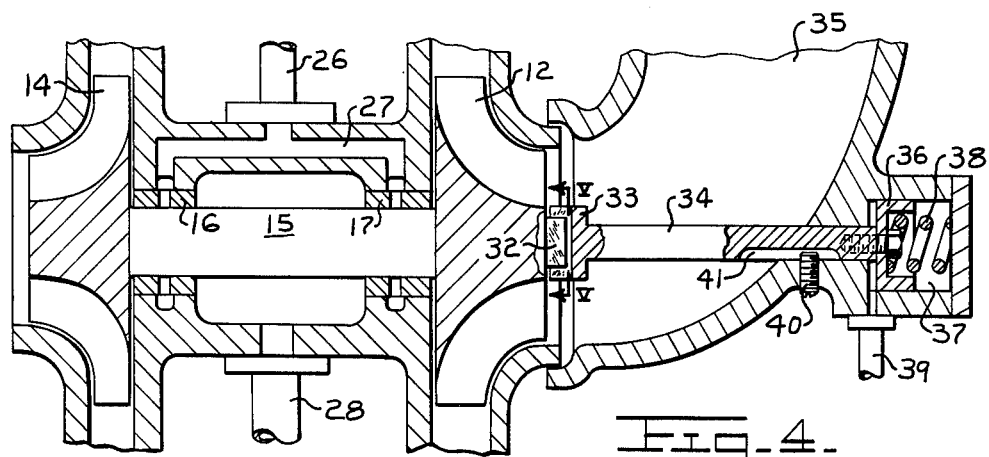
Figure 5:
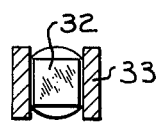

In the drawings:
FIG. 1 is a schematic view in side elevation of an engine having a turbocharger including the braking means of the present invention;
FIG. 2 is an enlarged fragmentary sectional view of the supercharger and braking means;
FIG. 3 is an enlarged sectional view taken on the line III—III of FIG. 2;
FIG. 4 is a sectional view similar to FIG. 2 showing a modification of the invention; and
FIG. 5 is a sectional view taken on the line V—V of FIG. 4.

An engine is shown generally at 10 in FIG. 1 as having a turbocharger 11 with a turbine 12 driven by exhaust gases from an exhaust manifold 13 and driving a compressor rotor 14 for supplying air under pressure into an intake manifold through conduit means, not shown. The turbine and compressor are mounted on a common shaft 15, best shown in FIG. 2 as supported in bearings 16 and 17. More elaborate bearings are usually employed and include seals but the simple sleeve type bearing herein shown will suffice to illustrate the principles of the present invention.

In order to prevent rotation of the turbocharger shaft in its bearings before they are adequately lubricated, a brake 18 (see FIGS. 2 and 3) bears against the periphery of the shaft 15 under pressure of a spring 19 behind a piston 20 formed as a part of the brake 18 and reciprocably mounted in a cylinder 21 which forms a part of the bearing housing.

The engine of FIG. 1 is shown as including the usual lubricating oil pump 23 supplying oil through a heat exchanger 24 and filters 25 to various engine components requiring lubrication. Lubricant to the turbocharger bearing is supplied through a conduit 26 which, as shown in FIG. 2, communicates with a passage system 27 leading to the bearings 16 and 17. Drainage to the lubricant sump is provided through an outlet 28. When the bearings 16 and 17 are supplied with lubricant under adequate pressure, pressure is transmitted through a perforation in the bearings 17 to a passage 30 communicating with the cylinder 21 above the piston therein to oppose the force of spring 19 and retract the brake 18 permitting rotation of the turbocharger. Consequently adequate lubrication of the turbocharger bearings is insured before rotation which might destroy them takes place.

A modified form of the invention is shown in FIG. 4 wherein the turbocharger is essentially the same as that shown in FIG. 2. In this modification, the outer end of the turbine 12 is provided with a square portion 32 (see also FIG. 5) which, when the engine is not in operation, is embraced by the bifurcated end 33 of a piston rod 34. This rod extends outwardly through an exhaust elbow 35 and has a piston 36 on its end reciprocable in a cylinder 37 and urged toward the braking position by a spring 38. A separate conduit 39 communicates with the source of lubricant under pressure and since the cylinder 37 is approximately the same distance from the source as the bearings 16 and 17, pressure entering the cylinder will retract the brake when the bearings have been adequately lubricated. If the squared end 32 of the turbine 12 is not in registry with the bifuricated end of the rod 34 when the engine comes to rest, failure of oil pressure in the cylinder 37 will permit the spring therein to urge the bifuricated end against the square 32 and registry will occur automatically when the engine is started and the turbine starts to rotate. Rotation of the rod 34 and piston 36 which might result from rotation of the turbocharger turbine may be prevented as by a pin 40 slidably fitting in a slot 41 in the rod 34.

We claim:
1. In combination with an engine having a turbocharger and a lubrication system supplying oil under pressure to turbocharger bearings when the engine is in operation, means to prevent operation of the turbocharger upon starting of the engine until lubricant under pressure reaches the turbocharger bearings comprising, a brake positioned to engage the turbocharger, a piston connected to the brake, a cylinder enclosing the piston, a spring on one side of the piston urging the brake into engaged position and means to direct lubricant under pressure from said lubrication system through at least one of said turbocharger bearings and to said cylinder at the opposite side of the piston to oppose the spring force and disengage the brake.
2. The combination of claim 1 in which the turbocharger bearings support a rotary shaft with a turbine and compressor thereon and the brake engages said shaft.
3. The combination of claim 1 in which the brake is in axial alignment with the turbocharger rotor and engages one end thereof.
4. The combination of claim 3 in which said end of the rotor has a noncircular extension and the brake has a part embracing said extension to hold the rotor against rotation.

References Cited by the Examiner
UNITED STATES PATENTS

| | | | |
|---|---|---|---|
| 586,745 | 7/97 | Pierce et al. | 188—74 |
| 910,388 | 1/09 | Junggren | 188—170 |
| 2,948,359 | 8/60 | Barret | 188—170 X |
| 3,060,827 | 10/62 | Forester et al. | |
| 3,102,382 | 9/63 | Bozzola | 60—13 |

EUGENE G. BOTZ, *Primary Examiner.*